United States Patent [19]

Luttenberger et al.

[11] Patent Number: 5,136,000
[45] Date of Patent: Aug. 4, 1992

[54] METHODS FOR PREPARING AND USING A WATER DILUTABLE COPOLYMER AND AQUEOUS COATING COMPOSITION PREPARED THEREWITH

[75] Inventors: Johannes Luttenberger; Herbert Zima; Werner Wilfinger; Ingo Kriessmann, all of Graz, Austria; Hermann Schäffer, Wuppertal, Fed. Rep. of Germany

[73] Assignee: Herberts GMBH, Wuppertal, Fed. Rep. of Germany

[21] Appl. No.: 753,225

[22] Filed: Aug. 30, 1991

[51] Int. Cl.$^5$ .................................. C08F 18/20
[52] U.S. Cl. .................................. 526/245
[58] Field of Search ........................... 526/245

[56] References Cited

U.S. PATENT DOCUMENTS

| | | |
|---|---|---|
| 4,547,558 | 10/1985 | Iwatsuki ............... 526/245 |
| 4,600,441 | 7/1986 | Goldberg et al. ......... 526/245 |
| 4,758,365 | 7/1988 | Neunier et al. .......... 526/245 |
| 5,061,769 | 10/1991 | Aharoni ................ 526/245 |

FOREIGN PATENT DOCUMENTS

| | | | |
|---|---|---|---|
| 57-51705 | 3/1982 | Japan | 526/245 |
| 62-41210 | 2/1987 | Japan | 526/245 |
| 2-151647 | 6/1990 | Japan | 526/245 |

*Primary Examiner*—Joseph L. Schofer
*Assistant Examiner*—N. Sarofin
*Attorney, Agent, or Firm*—Schweitzer Cornman & Gross

[57] ABSTRACT

A copolymer containing a hydroxy and a carboxyl moiety and is dilutable with water after neutralization with an organic base, which copolymer is from an alkyl ester and/or hydroxyalkyl ester of an $\alpha,\beta$-ethylenically unsaturated carboxylic acid in which the alkyl moiety is interrupted by one or more oxygen atoms and the alkyl moiety of the hydroxyalkyl ester can contain one or more hydroxyl groups, an $\alpha,\beta$-ethylenically unsaturated carboxylic acid, and an optionally copolymerizable vinyl monomer, and has an acid number of from about 20 to about 50, and an OH number of from about 40 to about 90, and contains incorporated by polymerization from about 0.5 to about 5% wt. based on the monomers used for its preparation of one or more perfluoroalkyl ethyl ester of an $\alpha,\beta$-ethylenically unsaturated carboxylic acid containing a $C_{6-18}$ alkyl moiety.

8 Claims, No Drawings

METHODS FOR PREPARING AND USING A WATER DILUTABLE COPOLYMER AND AQUEOUS COATING COMPOSITION PREPARED THEREWITH

FIELD OF THE INVENTION

This invention relates to hydroxyl and carboxyl group containing copolymers of alkyl esters and hydroxyalkyl esters of $\alpha,\beta$-ethylenically unsaturated carboxylic acids, and optionally copolymerizable vinyl monomers, which copolymers can be rendered dilutable by water by neutralization with organic bases and can be used in aqueous coating compositions. The invention further relates to aqueous coating compositions containing such copolymers.

As used throughout the specification and the claims, the term "(meth)acrylate" denotes acrylates and/or methacrylates.

BACKGROUND OF THE INVENTION

Copolymers containing fluorine are described in European patent No. 212,508. These are polyvinyl alcohols in which the hydroxyl groups have been esterified by a fluorinated fatty acid. These copolymers are used as water soluble binders for aqueous lacquers. These binders are said to provide improved gloss and improved hardness. Aqueous coating compositions from which films can be prepared, having exceptionally good water resistance are described in German published patent specification No. 3,339,212. This is achieved by providing a dispersion containing particles having a structure similar to onion skin. A complicated method is described in the German publication for preparing water resistant films.

DESCRIPTION OF THE INVENTION

It is an object of the present invention to provide coating compositions as bases for films with exceptionally good water resistance, good adherence to substrates and high gloss.

It has been found that this objective can be met by providing water dilutable copolymers containing one or more perfluoralkyl ethyl esters of $\alpha,\beta$-ethylenically unsaturated carboxylic acids incorporated by polymerization. Such copolymers can be added to aqueous coating compositions.

The present invention therefore relates to a water dilutable, hydroxyl and carboxyl moiety containing crosslinkable copolymer from an alkyl ester and a hydroxyalkyl ester of an $\alpha,\beta$-ethylenically unsaturated carboxylic acid in which the alkyl moieties can be interrupted by one or more oxygen atoms, and the alkyl moieties of the hydroxyalkyl esters have one or more hydroxyl residues, and further from $\alpha,\beta$-ethylenically unsaturated carboxylic acids and vinyl monomers, and having an acid number of from about 20 to about 50, and an OH number of from about 40 to about 90, containing from about 0.5 to about 5% wt, based on the weight of the monomers used for its preparation, of one or more perfluoroalkyl ethyl esters of $\alpha,\beta$-ethylenically unsaturated carboxylic acids with a $C_{4-16}$ alkyl moiety incorporated by polymerization.

The perfluoroalkyl ethyl alcohols on which the perfluoroalkyl ethyl esters are based correspond to the formulae

wherein n is a cardinal number from 4 to 16.

It has been found that the combination of such copolymers with crosslinkable aqueous dispersions and amino resin based hardeners used in aqueous coating compositions results in coatings which have improved adherence to, and wetting of, the underlying surface, gloss and improved resistance to water.

The copolymers of the present invention can be prepared by the copolymerization of the following monomers:

A) Alkyl esters of $\alpha,\beta$-ethylenically unsaturated carboxylic acids. The $\alpha,\beta$-ethylenically unsaturated carboxylic acids can, for example, include acrylic acid and/or methacrylic acid. The alkyl esters can be derived $C_{1-18}$ alkyl alcohols. Such alcohols can also be polyether alcohols in which the alkyl groups can be interrupted by one or more oxygen atoms. Suitably $C_{4-8}$ alcohols are used. Butyl alcohol and 2-ethyl-hexyl alcohol are particularly suitable examples. Most suitable are esters of these alcohols with acrylic acids or methacrylic acids.

Suitable alkyl esters of $\alpha,\beta$-ethylenically unsaturated carboxylic acids include butyl acrylate, butyl methacrylate, 2-ethyl hexyl acrylate and 2-ethyl hexyl methacrylate.

B) Hydroxyalkyl esters of $\alpha,\beta$-ethylencially unsaturated carboxylic acids. Acrylic acid and/or methacrylic acid are suitable examples of $\alpha,\beta$-ethylenically unsaturated carboxylic acids. These are preferably esterified with $C_{2-18}$ alkyl alcohols having two or more OH groups. Polyether alcohols having two or more OH groups can also be used, i.e. the alkyl group can be interrupted by one or more oxygen atoms. The alcohols contain one or more, most suitably one hydroxyl group in addition to the esterified hydroxyl group. Ethylene glycol, propylene glycol, diethylene glycol, triethylene glycol, dipropylene glycol and tripropylene glycol are examples of such alcohols.

Suitable esters include 2-hydroxyethyl acrylate, 2-hydroxyethyl methacrylate, 4-hydroxybutyl acrylate, 2-hydroxypropyl acrylate, tripropylene glycol acrylate, and tripropylene glycol methacrylate.

C) $\alpha,\beta$-Ethylenically unsaturated carboxylic acids of which acrylic acid and methacrylic acid are suitable examples.

D) Optionally vinyl monomers, particularly aromatic vinyl monomers such as styrene and its derivatives.

E) Perfluoroalkyl ethyl esters of $\alpha,\beta$-ethylenically unsaturated carboxylic acids with $C_{4-18}$, suitably $C_{4-14}$, in the alkyl group. Acrylic acid and methacrylic acid are examples of $\alpha,\beta$-ethylenically unsaturated carboxylic acids on which these esters are based. Suitable perfluoroalkyl esters include perfluorobutyl ethyl acrylate, perfluorobutyl ethyl methacrylate, perfluorohexyl ethyl acrylate, perfluorohexyl ethyl methacrylate, and perfluorododecyl ethyl methacrylate.

Suitably from about 2.5 to about 5% wt. based on the total polymerizable monomers of perfluoroethyl esters of $\alpha,\beta$-ethylencially unsaturated carboxylic acids are used.

Other mono-, di- and higher functional copolymerizable monomers can also be used for the preparation of the copolymers of the invention. For obtaining high dripping limits (the thickness of lacquer film upwards of which the film begins to run down a vertical surface) suitably polyfunctional radical chain transferrers are added in the copolymerization reaction. Examples of polyfunctional radical chain transferrers include trifunctional and tetrafunctional radical chain transferrers based, for example, on thioglycollic acid esters of glycerol, of trimethylolpropane and of pentaerythritol. Polyfunctional radical chain transferrers of this type result in stellate molecules.

The choice of quantitative proportions for the preparation of the copolymers according to the invention is carried out to produce hydroxyl and carboxyl containing copolymers which have an acid number of from about 20 to about 50, suitably from about 30 to about 40 mg of KOH/g, and a hydroxyl number (OH number) of from about 40 to about 90, suitably from about 55 to about 70 mg KOH/g.

For example, from about 40 to about 70% wt., suitably from about 40 to about 50% wt., of the aforementioned component A), from about 10 to about 30% wt. of the aforementioned component B), from about 3 to about 10% wt. of component C), from 0 to about 30% wt., suitably from about 20 to about 30% wt. of component D) and from about 0 to about 3% wt., suitably from about 0.5 to about 3% wt., of component F) can be reacted together. The proportion of perfluoroalkyl ethyl ester used as component E) is from about 0.5 to about 5% wt.

The copolymerization for the preparation of the copolymers of the present invention is carried out by conventional methods using conventional auxiliary agents and additives, such as catalysts.

The copolymers of the present invention can be prepared in various forms. For example, they can be obtained as solutions in organic solvents. They can, however, also be obtained as solvent containing aqueous solutions after neutralization with organic bases, for example with amines such as triethylamine, dimethylethanolamine, or N-methylmorpholine.

The neutralized copolymer can also be present as an aqueous dispersion without solvents. Suitable solvents for the preparation of the organic solutions or aqueous solutions are glycol ethers and diglycol ethers such as 2-n-butoxyethanol and dipropylene glycol monomethylether.

The copolymers according to the invention are particularly suitable for the preparation of water based coating compositions. Such coating compositions suitably contain aqueous dispersion of crosslinkable resins and one or more crosslinking agents.

The copolymers according to the invention can be added to aqueous coating compositions in a wide range of quantities. For example, mixtures of from about 10 to about 50% wt. of the copolymers according to the invention, from a 30 to a 80% wt. of one or more crosslinkable resins as an aqueous dispersion, and from about 10 to about 50% wt. of one or more crosslinking agents for the crosslinkable resin can be prepared, the percentages being always based on the solids content of the resins and adding up to 100% wt.

Examples of crosslinkable emulsion polymers dispersed in water (dispersions) are copolymers based on esters and hydroxyl group containing esters of $\alpha,\beta$-ethylenically unsaturated carboxylic acids as described above for the preparation of the copolymers of the present invention. $\alpha,\beta$-Ethylenically unsaturated carboxylic acids can be used, for example, as comonomers which impart carboxyl groups to the finished copolymer. Other copolymerizable comonomers, such as vinyl compounds, e.g. aromatic vinyl compounds such as styrene can be added for the preparation of the crosslinkable resin dispersions.

Examples of such $\alpha,\beta$-ethylenically unsaturated carboxylic acids, their esters, hydroxyl group containing esters, and vinyl compounds include the monomers mentioned above for the preparation of the copolymers according to the present invention.

Such acrylate dispersions can be prepared by known processes such as those described, for example, in F. Hölscher, "Dispersionen synthetischer Hochpolymerer, Part I: Eigenschaften, Herstellung und Prüfung" and the literature cited therein.

A suitable example of crosslinkable polymers present in the form of aqueous dispersion is described in Austrian patent No. 325,740, where 45 to 80% wt. of alkyl acrylates and/or alkyl methacrylates containing 1 to 8 carbon atoms in the alkyl moiety, such as methyl methacrylate, butyl acrylate, butyl methacrylate and/or ethylhexyl acrylate are subjected to an emulsion copolymerization in known manner together with from 10 to 20% wt. of a vinyl aromatic monomer such as styrene, from 1 to 3% wt. of methacrylic acid and/or acrylic acid and from 10 to 25% wt. of polyalkylene glycol methacrylates in the presence of anionic emulsifiers and free radical polymerization initiators. An aqueous, crosslinkable polymer dispersion particularly suitable for the aqueous coating composition according to the invention is thus obtained by the copolymerization of from about 25 to about 35% wt. butyl methacrylate, from about 10 to about 25% wt. ethyl hexyl acrylate and/or n-butyl acrylate, from about 10 to about 20% wt. methyl methacrylate, from about 10 to about 20% wt. styrene, from about 1 to about 30% wt. methacrylic acid and/or acrylic acid, and from about 10 to about 25% wt. polypropylene glycol monomethacrylate and/or polyethylene glycol monomethacrylate.

Polymerization is carried out in the presence of anionic and optionally nonionic emulsifiers and free radical polymerization initiators in an aqueous emulsion.

Conventional water soluble and/or water dispersible crosslinking agents based on amino resin, such as melamine formaldehyde condensation products can be used for crosslinking. The methylol groups of such melamine formaldehyde condensation products can be, for example, partly or completely etherified with monohydric alcohols. Melamine resins such as the ordinary commercial hexamethoxymethylmelamine resins (e.g. the Cymel 301 and Cymel 303) are also suitable. Such crosslinking agents can be, for example, used together with crosslinking catalysts such as amine salts of p-toluene sulfonic acid, or nonyl naphthyl disulfonic acid. Partially methoxymethylated melamine resins (e.g. Cymel 325 or cymel 327) can be used without acid catalysts. Such crosslinking agents are well known to the man of the art. Cymel products are sold by American Cyanamide Company.

For the preparation of the aqueous coating compositions according to the invention, from about 30 to about 80% wt. of one or more of the crosslinkable resins are generally mixed in the form of an aqueous dispersion with from about 10 to about 50% wt. of one or more of the copolymers according to the invention, and from about 10 to about 50% wt. of one or more crosslinking agents for the crosslinkable resin, the percentages being based on the resin solids content, and adding up to 100% wt.

The aqueous dispersions generally have a resin solids content of the order of from about 35 to about 50% wt. with a solvent content of from about 15 to about 25% wt. and a water content of from about 30 to about 50% wt.

The solids of from about 35 to about 50% wt. can include conventional additives such as the aforementioned crosslinking catalysts (present, for example, in quantities from about 0.3 to about 5% wt.) as well as other additives conventionally used in coating compositions and lacquers, such as pigments, fillers, levelling agents such as those containing silicone, light protective agents, and other conventional additives.

The aqueous coating compositions according to the present invention can be prepared by mixing the components. For example, the fluorine containing copolymer according to the invention neutralized with a suitable organic base, e.g. an amine, and dissolved in an organic solvent such as an ether, e.g. a glycol ether such as diglycol monobutylether, and stirred together with additives, and optionally the crosslinker resin can be introduced. When a hardening catalyst is used, this can, for example, be added to the solution as a neutralized catalyst dissolved in a mixture of water and organic solvent (e.g. glycols such as butyl glycol) and stirred in. Water can be added to the resulting mixture in a quantity which will not cause precipitation on addition of the dispersion. The aqueous crosslinkable polymer dispersion is then added. The procedure described above is, however, only one example of a number of possible method of mixing the components.

The coating composition according to the invention can be formulated for various purposes. For example, excellent clear lacquers can be formulated without the addition of pigments. Pigments can be, however, added, in particular coloring pigments and/or special effect pigments. The special effect pigments used can be, for example, platelet shaped pigments such as metallic pigments used for producing metallic effects.

The coating compositions according to the invention can thus be used for the production of multilayered coatings. They are particularly suitable for use in the motor vehicle industry, for example for the production of unilacquers, metallic lacquers and suitably clear lacquers.

The coating compositions according to the invention can be applied by various methods, such as brush coating, application with doctor blades, spraying, or electrostatic coating. The coating compositions according to the invention have an excellent levelling flow and gloss.

The copolymers and coating compositions according to the invention containing such copolymers enable the production of films which have excellent adherence to various substrates, for example to metal substrates or plastics substrates as well as to previously coated substrates. The films have excellent water resistance. The invention is further illustrated with the following examples.

EXAMPLES 1-9

Preparation of the Copolymers Containing Perfluoroalkyl Ethyl Esters

The monomers shown in Table 1 below are copolymerized in the quantitative proportions indicated there. The limiting viscosity number, the solids content and the hydroxyl, and acid numbers of the copolymer dispersion obtained, are also shown in Table 1.

TABLE 1

| | Example No. | | | | | | | | |
|---|---|---|---|---|---|---|---|---|---|
| | 1 | 2 | 3 | 4 | 5 | 6 | 7 | 8 | 9 |
| Perfluorobutyl ethyl acrylate | 1 | 1 | — | — | — | — | — | 0.5 | — |
| Perfluorohexyl ethyl methacrylate | — | — | 1 | 1 | — | — | 2 | — | — |
| Perfluorododecyl ethyl methacrylate | — | — | — | — | 1 | 1 | — | — | 4 |
| Styrene | 28 | 28 | 25 | 28 | 25 | 28 | 28 | 25 | 24 |
| 2-Ethyl hexyl acrylate | — | 21 | — | 23 | 48 | 20 | 20 | 23 | — |
| Butyl acrylate | 45 | 22 | 48 | 20 | — | 23 | 24 | 30.5 | 44 |
| Tripropylene glycol methacrylate | 9 | 12 | 9 | 12 | 9 | 12 | 5 | 6 | 12 |
| 4-Hydroxy butyl acrylate | — | — | — | — | — | — | 20 | — | — |
| 2-Hydroxyethyl methacrylate | 12 | 10 | 12 | 10 | 12 | 10 | — | — | 12 |
| 2-Hydroxypropyl acrylate | — | — | — | — | — | — | — | 10 | — |
| Methacrylic acid | 5 | 6 | 5 | 6 | 5 | 6 | — | — | 4 |
| Acrylic acid | — | — | — | — | — | — | 6 | 5 | — |
| Polyfunctional regulators* | 2 | 2 | 2 | 2 | 2 | 2 | 2 | 2 | 2 |
| [n] 2% CHCl$_3$ (ml/g) | 8.2 | 7.9 | 9.4 | 8.8 | 7.2 | 7.9 | 8.6 | 8.9 | 7.5 |
| Solids content % | 70 | 70 | 70 | 70 | 70 | 70 | 70 | 70 | 70 |
| OH number (mg KOH/g) | 65.0 | 60.8 | 65.0 | 60.8 | 65.0 | 60.8 | 85.1 | 51.9 | 69.4 |
| Acid number (mg KOH/g) | 32.6 | 39.1 | 32.6 | 39.1 | 32.6 | 39.1 | 46.7 | 38.9 | 26.0 |

*Pentaerythritol tetrathioglycollic acid ester

Preparation of Solution Copolymers Containing Perfluoroalkyl Ethyl Esters

General Method of Preparation

Dipropylene glycol monomethyl ether is introduced as solvent under a cover of inert gas into a reaction vessel equipped with reflux condenser, feed vessel, thermometer, inert gas conduit, heating and cooling means and stirrer, and the solvent is heated to 145° C. The mixture of monomers, polyfunctional regulators and di-tertbutyl peroxide (3 to 5% calculated on the monomers) is run in from the feed vessel in the course of from about 4 to about 6 hours. When addition of this mixture was completed, the temperature is maintained at 145° C. for a further 2 hours to complete the reaction.

Preparation of an Aqueous Polymer Dispersion (Acrylate Dispersion)

All parts are by weight.

a) 3 parts of sodium lauryl ethoxylate sulfate, 9.8 parts ethoxylated octyl phenol (16 mol of EO), 2 parts ammonium persulfate and 1090 parts deionized water are dissolved in a polymerization stirrer apparatus and the solution is heated to 75° C., and a mixture of b) 225 parts butyl methacrylate, 225 parts ethylhexyl acrylate, 162 parts methyl methacrylate, 180 parts styrene, 90 parts polypropylene glycol monomethyl acrylate, 18 part acrylic acid and 4.4 parts tert-dodecylmercaptan is run in within 90 minutes. While mixture b) is being run in, the temperature is slowly raised to 85° C.

When all the mixture has been added, 28 parts of a $C_{12-14}$ fatty alcohol reacted with 25 moles ethylene oxide and 3 parts of an octyl phenol reacted with 3 moles ethylene oxide and sulfated, are added as a solution in 100 parts of water. To complete the reaction, the temperature is raised to 95° C. and maintained there for 10 minutes. A very stable dispersion having a solids content of 49% wt. is obtained after cooling.

The dispersion is worked up by adjusting to pH 7.5 with an alkanolamine, e.g. dimethylethanolamine.

Preparation of Water Clear Lacquers—EXAMPLES 10 to 18

Water clear lacquers were prepared by mixing the components shown in Table II below. The clear lacquers obtained were applied by spraying in two layers to produce a total dry film thickness of from about 35 to about 40μ to a metallic base lacquer which had been partly dried at 80° C. for 5 minutes. The clear lacquer was then baked for 30 minutes at 140° C. The coating obtained were tested for adherence by the grid section test cross hatch test, stone chipping, resistance in the sweating box (condensation cabinet), for 240 hours, at 40° C., and degree of gloss and dripping limit. The result obtained are shown in Table II below.

We claim:

1. The copolymer obtained by the copolymerization of (a) from about 40 to about 70% wt. solids basis of one or more alkyl esters of $\alpha,\beta$-ethylenically unsaturated carboxylic acid containing a $C_{1-18}$ alkyl moiety that can be interrupted by one or more oxygen atoms, (b) from about 10 to about 30% wt. of one or more hydroxyalkyl ester of a $\alpha,\beta$-ethylenically unsaturated carboxylic acid containing a $C_{1-18}$ alkyl moiety which can be interrupted by one or more oxygen atoms and has one or more hydroxyl residues, (c) from about 3 to about 10% wt. solid basis of an $\alpha,\beta$-ethylenically unsaturated carboxylic acid, (d) from about 0.5 to about 5% wt. solid basis of one or more perfluoralkyl ethyl esters of $\alpha,\beta$-ethylenically unsaturated carboxylic acids containing a $C_{4-18}$ alkyl moiety, (e) from 0 to about 3% wt. solids basis of a trifunctional, tetrafunctional, or polyfunctional radical chain transfering agent, and (f) from 0 to about 30% wt. of vinyl monomers, the percentages by wt. being based on the solids content of the monomers used and adding up to 100% wt.

2. The copolymer of claim 1, wherein the $\alpha,\beta$-ethylenically unsaturated carboxylic acid and the $\alpha,\beta$-ethylenically unsaturated carboxylic acid on which the ester, hydroxyalkyl ester, and perfluoroalkyl ether ester are based, is acrylic acid, and/or methacrylic acid.

3. The copolymer of claim 1, wherein vinyl monomer is an aromatic vinyl monomer.

4. The copolymer of claim 1, wherein the upper limit in (a) is 50% wt., and further (f) from about 20 to about 30% wt. solids basis of a vinyl monomer.

5. The copolymer of claim 1, wherein the $\alpha,\beta$-ethylenically unsaturated carboxylic acid, and the $\alpha,\beta$-ethylenically unsaturated carboxylic acid on which the alkyl ester, hydroxyalkyl ester, and perfluoroalkyl ether ester are based, are acrylic acid and/or methacrylic acid.

6. The copolymer of claim 1, wherein the vinyl monomer is styrene.

7. The copolymer of claim 1, wherein the polyfunctional radical chain transfering agent is based on a thioglycolic acid ester of glycerol, trimethylolpropane, or pentaerythritol.

8. An aqueous coating composition containing one or more copolymers of claim 1.

TABLE II

| | Example | | | | | | | | |
|---|---|---|---|---|---|---|---|---|---|
| | 10 | 11 | 12 | 13 | 14 | 15 | 16 | 17 | 18 |
| Demineralised water | 2.0 | 2.0 | 2.0 | 2.0 | 2.0 | 2.0 | 2.0 | 2.0 | 2.0 |
| Silicone-containing levelling agent | 0.50 | 0.50 | 0.50 | 0.50 | 0.50 | 0.50 | 0.50 | 0.50 | 0.50 |
| Demineralised water | 10.0 | 10.0 | 10.0 | 10.0 | 10.0 | 10.0 | 10.0 | 10.0 | 10.0 |
| Total | 100.0 | 100.0 | 100.0 | 100.0 | 100.0 | 100.0 | 100.0 | 100.0 | 100.0 |
| Quantity of water in g required for adjusting to | | | | | | | | | |
| spraying viscosity | 5 | 12 | 14 | 17 | 8 | 14 | 11 | 8 | 4 |
| Solids content at spraying viscosity in % | 42.86 | 40.18 | 39.47 | 38.46 | 41.67 | 39.47 | 40.54 | 41.67 | 43.27 |
| Solvent content at spraying viscosity in % | 18.10 | 16.96 | 16.67 | 16.24 | 17.59 | 16.67 | 17.12 | 17.59 | 18.27 |
| Adherence (grid section) | GTO | GTO | GTO | GTO | GTO | GTO | GT1 | GTO | GTO |
| Stone chipping according to VW | KW 1-2 | KW 1 | KW 3 | KW 3 | KW 2 | KW 1-2 | KW 2-3 | KW 1-2 | KW 1 |
| Sweat box 240 hours/40° C. | i.O. | i.O. | i.O. | i.O. | i.O. | i.O. | i.O. | i.O. | i.O. |
| Degree of gloss | 93% | 91% | 88% | 91% | 92% | 89% | 85% | 88% | 85% |
| Dripping limit | 50 μm | 55 μm | 40 μm | 45 μm | 55 μm | 55 μm | 55 μm | 50 μm | 45 μm |

KW 1 = very good
KW 2 = good
KW 3 = acceptable
i.O. = in order (OK)
GTO = very good
GT1 = good